Jan. 26, 1971 FUJIHIKO TOMITA 3,558,198
ENDLESS TRACK FOR MOTOR DRIVEN VEHICLES
Filed Nov. 1, 1968
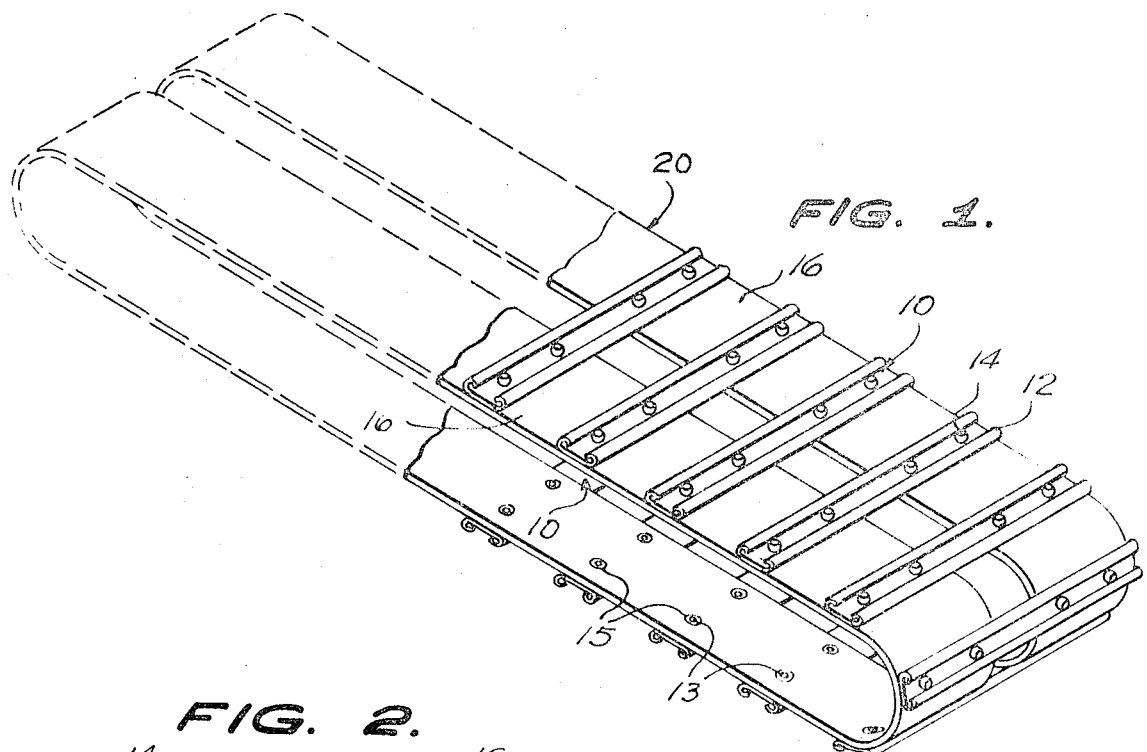
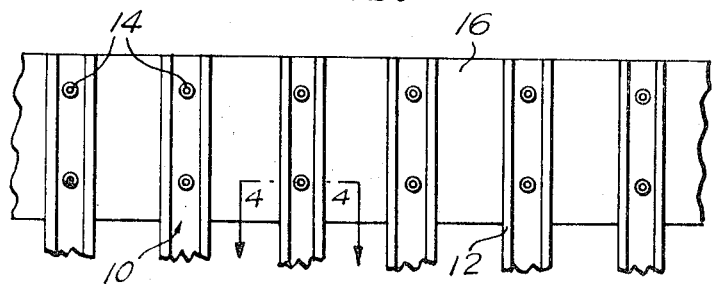
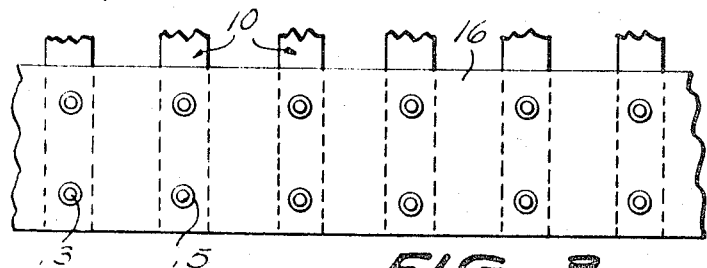
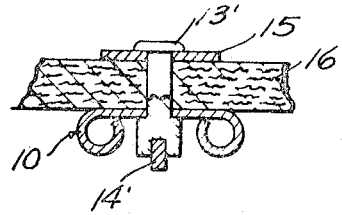
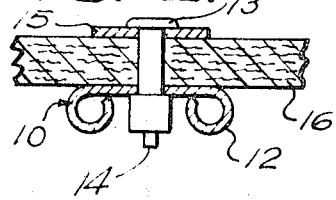
INVENTOR.
FUJIHIKO TOMITA,
BY
*Berman, Davidson & Berman*
ATTORNEYS.

United States Patent Office 3,558,198
Patented Jan. 26, 1971

3,558,198
ENDLESS TRACK FOR MOTOR DRIVEN VEHICLES
Fujihiko Tomita, Shizuoka-ken, Japan, assignor to Yamaha Hatsudoki Kabushiki Kaisha, Shizuoka-ken, Japan
Filed Nov. 1, 1968, Ser. No. 772,702
Int. Cl. B62d 55/26
U.S. Cl. 305—35      5 Claims

ABSTRACT OF THE DISCLOSURE

An endless track having transverse treads secured by fastening elements such as bolts or rivets appended with quenched and hardened projections jutting beyond ground-touching edges of the treads and, therefore, preventing the endless track from slipping sidewise.

---

This invention relates to an endless track for motor driven vehicles such as snowmobiles, or tractors, and the like, and more particularly to an improved endless track having transverse treads secured on the outer, or ground-touching, face thereof.

The endless track of this invention is intended to be used preferably for a snowmobile of small size and lightweight construction designed for fast movement. With such vehicle, the driver makes frequent quick turns over frozen roads and ice-bound surfaces, and traverses ice-bound slopes, shifting his weight to make the body of the snowmobile lean toward the upper sides of the slopes. Frequently this causes sideslips and the danger of losing control of the snowmobile, particularly when the vehicle is equipped with conventional endless tracks with treads, these being basically designed for use on soft snow.

The most important object of this invention is, therefore, to provide an improved endless track for snowmobiles, and the like, having increased driving force and traction, and which yet avoids skids on frozen roads and ice-bound slopes, said improved track being characterized by use of a plurality of transverse treads secured to the track by fastening elements having quenched and hardened projections which jut beyond the ground-touching edges of the treads for piercing the supporting surface to prevent side slippage.

A second important object of this invention is to provide an improved endless track, having the above described characteristics, wherein the durability of the endless track is increased by hardening the said projections of the tread securing elements.

A third important object of this invention is to provide an improved endless track, having the above described characteristics, wherein the durability of said treads is increased by bending and curling the longitudinal ground-touching edges of said treads.

Yet another important object of the invention is to provide an improved endless track, having the above described characteristics, which is of simple construction, easy and economical to fabricate, and safe and certain in operation.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is a diagrammatic perspective view of an endless track in accordance with the invention, a portion being shown in full;

FIG. 2 is a plan view of a portion of the outer, or ground-touching, face of the endless track;

FIG. 3 is a plan view showing the inner face of the track corresponding to the reverse side of FIG. 2;

FIG. 4 is a cross-sectional view taken on line 4—4 of FIG. 2; and

FIG. 5 is a cross-sectional view similar to FIG. 4, showing a modified embodiment of the fastening element.

Referring now more particularly to the drawings, the invention comprises an endless track, generally indicated by reference numeral 20, formed of one or more elongated strips, or belts 16, made of molded rubber, or rubber-like material. Each flexible strip 16 is formed into an elongated loop with its ends joined and fixed together by conventional means. One, or a plurality of these strips joined in side-by-side relation, define the endless track 20 (FIG. 1), which may be about 15" wide and about 50" long, and is suitable for use on a snowmobile.

Any suitable and conventional means may be chosen for driving the track 20, as for example, a gas engine connected through a clutch and a chain drive to a drive drum at one end of the adjacent loops 16, an idler drum at the other end, and intermediate rollers or bogey wheels disposed between the drive and idler drums and separating the upper and lower reaches of the endless track. The drive means forms no part of this invention and, therefore, is not shown in the drawings.

Evenly spaced along the outer, or ground-engaging face of the endless track 20 are a plurality of reinforcing, transverse treads 10 whose longitudinal edges, also transverse to the track and its direction of movement, are bent to form ground-engaging curls 12, best shown in FIGS. 1 and 4. The treads are preferably formed of steel, or other similar hard and durable material. Each tread is affixed to the track 20 by a plurality of spaced bolts, or rivets 13, which pass through washers 15 on the inner face of the track and aligned openings in the track and tread. To secure the treads to the track, each bolt is provided with a nut, or each rivet is provided with an enlargement engaging the portions of the treads surrounding said openings. These enlargements on the rivets are provided with projections 14 which jut beyond the ground-engaging curls 12 of the treads to pierce the supporting surface and prevent the endless track from slipping toward its sides, i.e., longitudinally of the transverse treads. Preferably, at least the projection 14, if not the entire bolt or rivet, is hardened to improve wear and durability. Any conventional hardening may be used suitable for the particular metal of the fastener such as case hardening, heating and quenching, etc.

In FIG. 5 is shown a modified embodiment of the fasteners which, in all respects, is the same as that of the embodiment shown in FIGS. 1–4, except that the outer and enlarged ends of the rivets 13' are provided with recesses in which are inserted hardened metal spikes 14' corresponding to the projections 14. The spikes are integrally united to the rivets as by brazing, welding, and the like.

It will be apparent from the above description that the endless track of the invention provides a simple and economical structure of small size and lightweight, highly suitable for use in driving a snowmobile quickly and safely, the projections 14, 14' on the ground-touching edges of the tread bolts keeping the snowmobile from sideslips during fast turns over frozen roads or ice-bound surfaces, and the treads increasing the traction and running power of the snowmobile, particularly over frozen slopes.

Furthermore, the described endless track is durable and long-lasting, yet easy and economical to produce. By providing bolts with removable nuts carrying the projections which jut beyond the ground-touching edges of the treads, both the securing bolts and treads may be easily replaced for maintenance.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An endless track for a motor driven vehicle to be operated on ground, snow, ice, and the like, comprising, at least one endless belt of flexible material for disposition longitudinally of the vehicle, a plurality of channel shaped treads formed of a rigid metallic material and disposed in spaced relation transversely of said belt on its outer face, said treads having ground-touching longitudinal edges extending transversely of the belt, and fastening elements securing said treads on said belt and having projections jutting beyond said ground-touching edges of the treads, said projections being spikes of harder material secured to said fastening elements.

2. An endless track as claimed in claim 1, wherein said fastening elements comprise rivet-like elements and said spikes are quenched and hardened and integrally united to the rivet-like elements.

3. An endless track as claimed in cliam 1, wherein said ground-touching edges of said treads are bent to form curls extending along the longitudinal sides of the treads.

4. An endless track as claimed in claim 1, wherein said track comprises a plurality of said endless belts disposed longitudinally and side-by-side, said transversely extending treads being each fastened to all of said belts and serving to secure the individual belts together for uniform movement as a single track.

5. An endless track as claimed in claim 1, wherein each of said treads comprises a flat strip of metal whose longitudinal edges are curled into cylinders projecting outwardly from one side of the strip, said fastening elements passing through apertures in the flat strip and having enlargements seated between said cylinders, the said projections of the fastening elements protruding from said enlargements outwardly beyond the cylinders.

References Cited

UNITED STATES PATENTS

| | | | |
|---|---|---|---|
| 1,752,024 | 3/1930 | Parker | 152—210 |
| 1,886,839 | 11/1932 | Scheckel | 305—38 |
| 2,702,211 | 2/1955 | Arps | 305—54X |
| 3,148,920 | 9/1964 | Nodwell | 305—35(EB) |
| 3,416,845 | 12/1968 | Scanland | 305—38 |
| 1,696,125 | 12/1928 | Rantasa | 180—5 |

FOREIGN PATENTS

| | | | |
|---|---|---|---|
| 464,814 | 8/1928 | Germany | 305—54 |
| 1,078,717 | 8/1967 | Great Britain | 305—38 |

OTHER REFERENCES

Popular Mechanics, October 1967, pp. 138–139.

RICHARD J. JOHNSON, Primary Examiner

U.S. Cl. X.R.

305—54